Feb. 28, 1956 — H. W. ATKINS — 2,736,274
ICE CREAM FLAVOR INSERTER
Filed Aug. 8, 1950 — 3 Sheets-Sheet 1

INVENTOR
Harold Wm Atkins
BY
ATTORNEYS

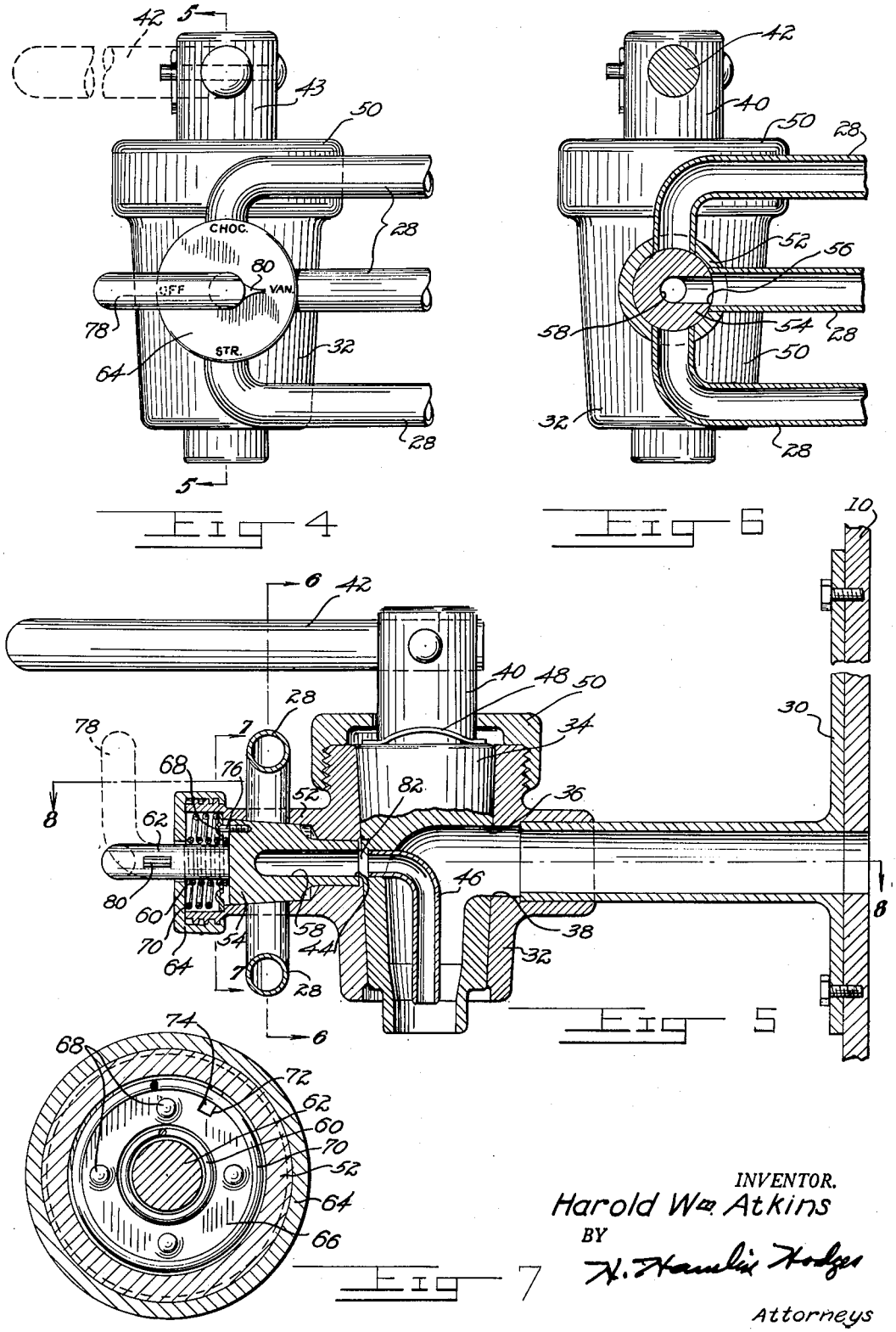

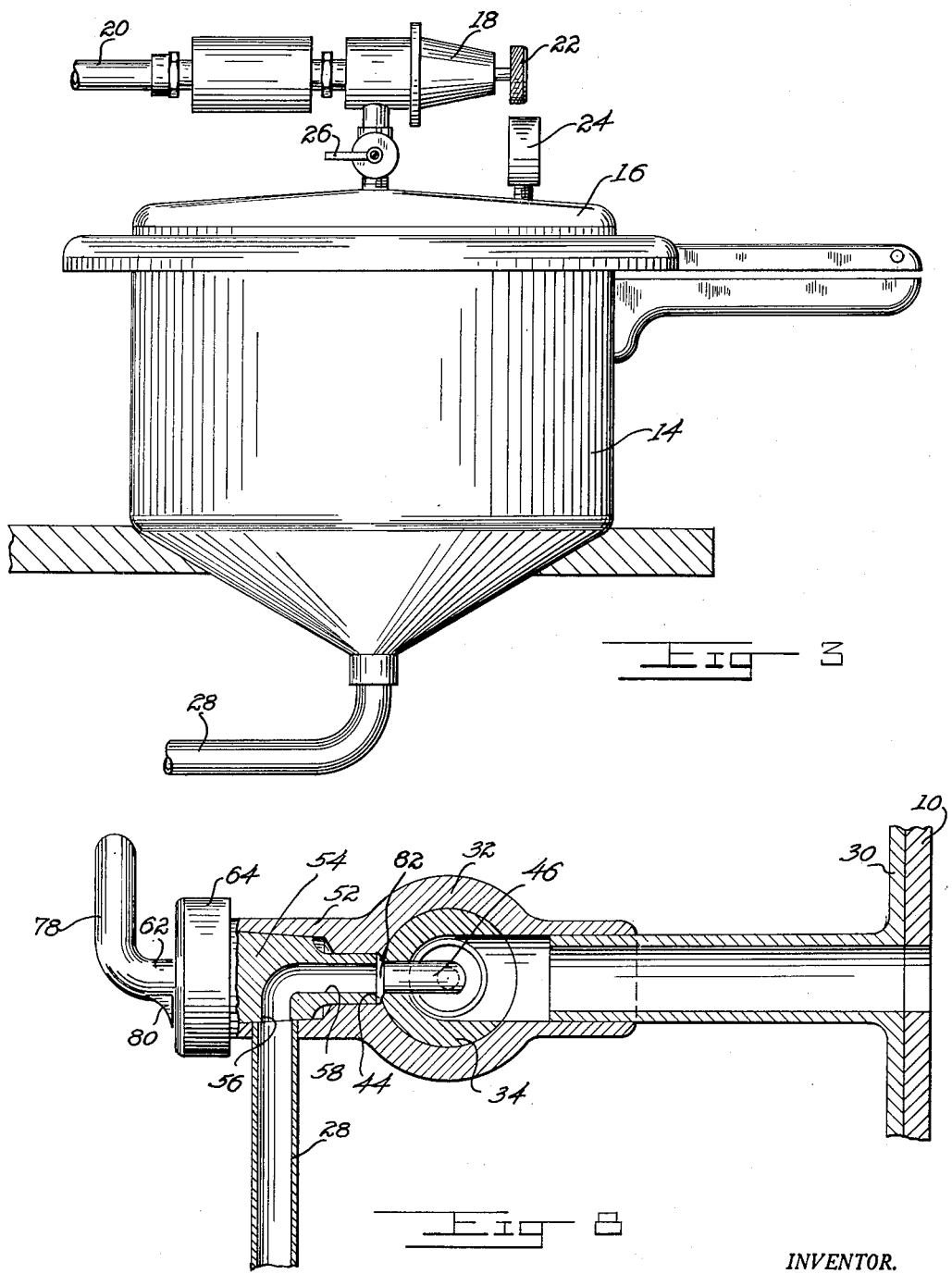

United States Patent Office 2,736,274
Patented Feb. 28, 1956

2,736,274

ICE CREAM FLAVOR INSERTER

Harold William Atkins, Pensacola, Fla., assignor to Dari-Go-Round, Inc., Minneapolis, Minn., a corporation of Minnesota Application August 8, 1950, Serial No. 178,334

4 Claims. (Cl. 107—1)

This invention relates to apparatus whereby a selected flavor of syrup may be injected or fed to intermingle with a stream of neutral ice cream being extruded from a conventional continuous ice cream freezer.

In the past many continuous ice cream freezers have been produced, the freezer extruding an ice cream mixture which has previously been introduced into the continuous freezer for subsequent use as desired. Normally such continuous ice cream freezers are adapted to produce a popular flavored ice cream or one to which other flavoring material may be suitably added externally of the ice cream extruded. If it is desired to produce ice cream having a differing flavor, it then becomes necessary to completely empty and clean the continuous freezer before a mix of a different flavor is placed therein to be frozen.

An object of my invention is to provide mechanism whereby a selected flavor may be injected into ice cream being extruded from a continuous ice cream freezer.

A further object is to provide a valve control whereby different flavors may be introduced at desired times to ice cream extruded from a continuous freezer.

A still further object is to provide a mechanism whereby a variety of flavors of ice cream may be produced and dispensed from one machine rather than from an independent machine for each desired flavor.

An even further object is to provide a valve control whereby a selected flavor may be mixed with a frozen ice cream as it is extruded from a continuous ice cream freezer.

An even further object is to provide mechanism whereby a flavor may be simultaneously injected into ice cream by the control of one faucet.

In the drawings:

Fig. 3 is an enlarged view in front elevation of one pressure pan;

Fig. 4 is an enlarged view in front elevation of a control valve;

Fig. 5 is a similar view with certain parts thereof shown sectionally on the line 5—5 of Fig. 4, looking in the direction of the arrows;

Fig. 6 is a vertical cross-section on the line 6—6 of Fig. 5, looking in the direction of the arrows;

Fig. 7 is an enlarged vertical cross-section on the line 7—7 of Fig. 5, looking in the direction of the arrows, and;

Fig. 8 is an irregular horizontal cross-section on the line 8—8 of Fig. 5, looking in the direction of the arrows.

Figure 1:
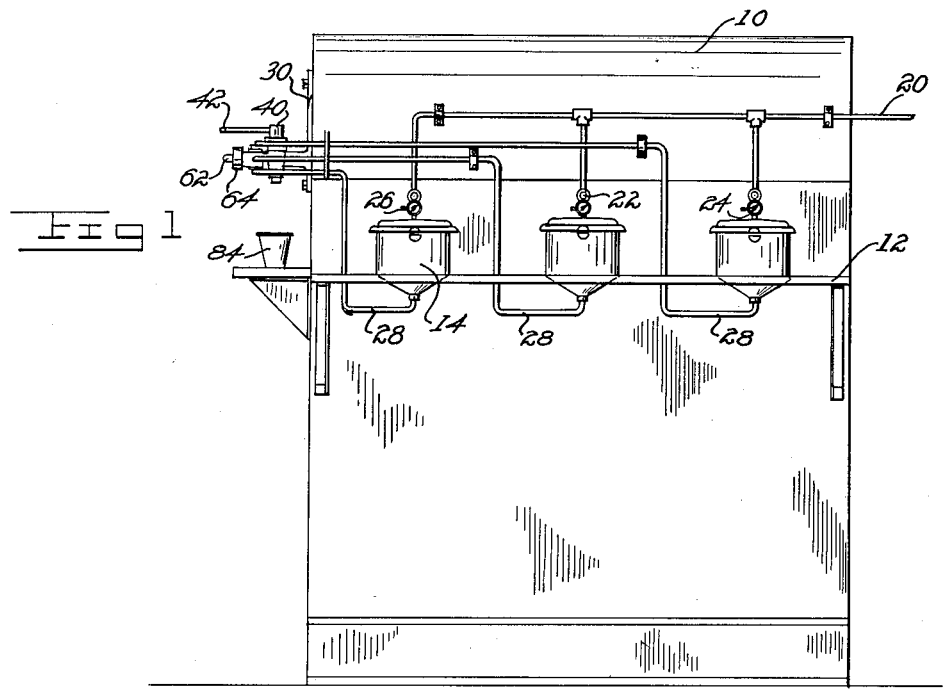
Fig. 1 is a side elevation of a continuous ice cream freezer to which three independent flavor pressure pans are attached.
Figure 2:
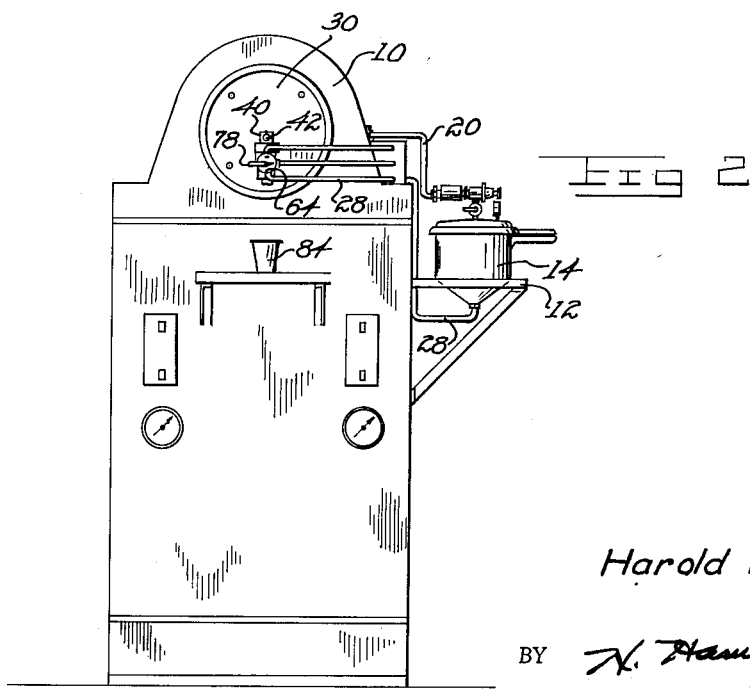
Fig. 2 is a view in front elevation.

A conventional continuous ice cream freezer 10 is diagrammatically represented and is provided on its side with a suitably supported shelf 12 on which I have represented three flavor syrup pressure pans 14. The pressure pans 14 have attached to their lids 16 a conventional pressure regulator 18 which is suitably piped by the pipe 20 to an air pressure tank, not shown. The pressure may be suitably controlled by the adjustment of a knurled head 22 secured to the conventional valve within the regulator 18. Preferably a gauge 24 is provided so that pressure within the pan 14 may be desirably adjusted. At the time that pressure is to be cut off completely, the conventional stop valve 26 may be utilized.

At the bottom of the pressure pan 14, a suitable tube or pipe 28 is attached and is adapted to extend forwardly of the continuous freezer to be secured to a valve mechanism which will be more fully described hereinafter.

At the front or discharge end of the continuous freezer 10, I secure a faucet positioning plate 30 adapted to align a control valve or faucet 32 with the extrusion exit of the continuous freezer 10. The faucet 32 is provided preferably with a frusto-conical core 34 having therein two orifices. One orifice 36 is adapted to be placed in alignment with the orifice 38 within the complementary frusto-conical portion of the faucet 32 suitably connected with the faucet positioning plate 30. The frusto-conical core 34 is provided with a suitable upstanding portion 40 thereof having secured thereto a handle 42 which may be riveted, bolted or otherwise secured, so that the core 34 may be rotated as desired by movement of the handle 42.

Diametrically opposed to the orifice 36 within the frusto-conical core 34, I provide a second orifice 44, adapted to register with a complementary orifice provided on the side of the faucet or control valve casing 32 diametrically opposite to the orifice 38. In registry with the orifice 44, I provide a pipe or tube 46 which extends inwardly within the frusto-conical core 34 to discharge therewithin.

The frusto-conical core 34 is urged downwardly into contact with the internal surface of the faucet 32 by the spring 48 which is secured to the frusto-conical core 34 and bears against a suitable screw threaded cap 50 adapted to be secured upon the uppermost end of the faucet 32.

Secured to the faucet 32 at the side thereof remote from its connection with the faucet positioning plate 30, I provide preferably a four way valve casing 52 to which are secured the tubes or pipes 28 extending to the pressure pans 14. The four way valve casing 52 is provided with a core 54 having therein one orifice 56 adapted to register with the end of either of the pipes or tubes 28 secured to the four way valve casing 52.

The orifice 56 is connected directly with a central bore 58, which, at its end remote from its connection with the orifice 56, connects with the orifice 44 communicating directly with the pipe or tube 46. The core 54 is seated within the four way valve casing 52 and is maintained in its seated condition by a suitable coil spring 60 which is positioned around a stud 62 extending outwardly from the core 54. The stud 62 passes through a ring nut 64 which is screw-threaded to the four way valve casing 52. In this manner, the core 54 may be maintained in its seated position within the casing 52 by pressure of the spring 60 interposed between the core 54 and the ring nut 64.

A washer 66, having a plurality of detents or dimples 68, freely encircles the stud 62 and its surrounding spring 60 and is spring pressed toward the core 54 by the spring 70. The washer 66 is provided with a notch 72 which encloses an outstanding lug 74 extending inwardly from the casing 52 on its side remote from the orifice 44 in the core 54. Thus, the washer 66 will remain stationary relative to the casing 52.

A suitable pin 76 is screw-threaded or otherwise secured within the core 54 in position to become engaged with one of the detents or dimples 68. Thus, as the core 54 is revolved by turning the handle 78, secured to the end of the stud 62, a change of position of the core 54 and its orifice 56 will be made so that it will register with either of the pipes or tubes 28, one at a time. At the same time the pin 76 will be moved from its position within one dimple or detent 68 until it is seated within another detent 68.

Preferably the ring nut 64 is provided on its outer surface with a notation indicating which pressure pan 14 is in communication with the central bore 58. Also secured to the stud 62, I provide a suitable pointer 80 which will point directly to the indication on the ring nut 64 to advise which pressure pan is placed into communication with the bore 58.

Within the faucet or control valve 32, and in association with the end of the pipe or tube 46, I provide a groove 82 cut circumferentially within the faucet casing 32. Thus, as the frustoconical core 34 is turned to permit the orifice 36 to come into contact with the orifice 38 to permit the flow of frozen ice cream from the continuous ice cream freezer 10, the end of the tube 46 will be coming into contact with the cut away groove 82, and thus a complete communication will register between the orifices 36 and 38 at the same time that the tube 46 is in complete registry with the orifice 44. The result of this will be that as a limited amount of frozen material is extruded from the continuous freezer, also a limited amount of selected syrup will be extruded from a pressure pan 14, and at the time that the orifices 36 and 38 are in complete registry, the orifice 44 will also be in complete registry with the end of the pipe or tube 46 secured within the core 34.

It will be understood that by adjustment of the pressure regulators 18, the amount of pressure directed to each selected pressure pan 14 may be controlled in order to assure the delivery of a metered amount of flavoring extract into the frozen material being extruded from the continuous freezer. Obviously flavoring syrups are of variable viscosity, and it is also evident that viscosity may differ at the time that a varying temperature is applied to the source of supply.

*Operation*

Preferably the continuous freezer will contain a mixture of what might be considered a neutral flavor of ice cream. Hence by filling the three, or more, pressure pans with syrups of varying flavor, any desired flavor may be given to the neutral flavor of frozen material being extruded from the continuous freezer.

At the outset, the pressure regulators 18 will be adjusted by the operator to adjust the amount of flavoring extract which may be withdrawn from any selected one of the pressure pans 14. By first turning the handle 78 and placing the pointer 80 in a desired position, a selected pressure pan 14 may thus be directly connected, through its tube or pipe 28, so that the content of the pressure pan 14 will be directed through the central bore 58 to the orifice 44. After a flavor has thus been selected, then the handle 42 may be turned and with it the frustoconical core 34 to align its orifice 36 and its diametrically opposed orifice, connected with the end of the pipe 46, with their respective complementary orifices 38 and 44. Thus, by turning the handle 42, the frozen contents from the continuous freezer 10 may be introduced through the orifice 36 and simultaneously a selected flavor will be introduced into the tube or pipe 46 so that the combined frozen ice cream and flavor may consequently be extruded together from the bottom of the frusto-conical core 34. Obviously the frozen material thus extruded may be introduced into a cup 84, or cone, for sale and use.

I claim:

1. In an extrusion controller for attachment to the product outlet of a freezer capable of producing in a continuous manner a frozen food product such as ice cream, an extrusion valve connected to the said freezer, a plurality of flavor syrup pans, a flavor valve communicating with each of the said pans, a single entrance port communicating with a single exit port in said flavor valve, the said exit port extruding syrup into the said extrusion valve, and means maintaining the said flavor valve in communication with any one pressure pan and the said extrusion controlling valve.

2. In an extrusion controller for attachment to the product outlet of a freezer of the type which can produce ice cream and the like in a continuous manner, the combination of an extrusion controlling valve, a plurality of containers for holding flavor syrup under pressure, a multiple-way valve connecting with all of said containers, and core means within the said multiple-way valve directing the contents of any one container into the extrusion controlling valve.

3. A flavor inserting device adapted to be attached to the product outlet of a continuous freezer in the manufacture of ice cream and the like comprising a casing having a longitudinal opening therethrough, a lateral inlet opening for the introduction of ice cream and the like and a flavor inserting opening also formed laterally therethrough, a relatively rotatable core within said longitudinal opening having an opening formed laterally therein for registry with the lateral opening of said casing and extending medially and downwardly to terminate in a product outlet, a flavor inserting tube fixed in the core member and adapted to register with the lateral flavor opening through the casing, said tube extending into said core and extending downwardly to terminate adjacent the terminus of said core outlet, said tube presenting an opening having an elongated groove formed arcuately of the core member and in communication with the tube for metering flavor proportionately to the amount of ice cream product and the like introduced to said lateral casing opening when the core member is rotated relative to said casing.

4. In an extrusion controller for attachment to the product outlet of a freezer of the type which can produce ice cream and the like in a continuous manner, the combination of an extrusion controlling valve, a multiple-way valve connecting with said extrusion controlling valve and adapted to receive flavor syrup under pressure from any one of a plurality of containers, and means for receiving flavor syrup from said multiple-way valve and introducing it medially within said extrusion controlling valve in mixed relation with the product passing therethrough.

References Cited in the file of this patent

UNITED STATES PATENTS

| 2,190,226 | Alexander | Feb. 13, 1940 |
| 2,313,060 | Friedman | Mar. 9, 1943 |
| 2,639,678 | Martin | May 26, 1953 |